United States Patent
Li et al.

(10) Patent No.: US 9,471,157 B2
(45) Date of Patent: Oct. 18, 2016

(54) COMPUTER MOUSE HAVING VARIABLE SIZE

(71) Applicant: ShenZhen Goldsun Network Intelligence Technology Co., Ltd., ShenZhen (CN)

(72) Inventors: Dong-Feng Li, Wuhan (CN); Ching-Jou Chen, New Taipei (TW); Chao-Chi Chang, New Taipei (TW); Yun-Dong Xu, Wuhan (CN); Chang-Sheng Zhou, Wuhan (CN)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 0 days.

(21) Appl. No.: 14/543,636

(22) Filed: Nov. 17, 2014

(65) Prior Publication Data

US 2016/0109963 A1    Apr. 21, 2016

(30) Foreign Application Priority Data

Oct. 15, 2014   (CN) .......................... 2014 1 0543608

(51) Int. Cl.
    *G06F 3/0354*    (2013.01)
(52) U.S. Cl.
    CPC ....... *G06F 3/03543* (2013.01); *G06F 3/03544* (2013.01); *G06F 2203/0332* (2013.01)
(58) Field of Classification Search
    CPC ........... G06F 3/03543; G06F 3/03544; G06F 3/033; G06F 3/039; G06F 1/16; G09G 5/08
    USPC ....................................................... 345/163
    See application file for complete search history.

(56) References Cited

U.S. PATENT DOCUMENTS

| | | | | |
|---|---|---|---|---|
| 6,099,929 A * | 8/2000 | Chinen | .................. | G06F 3/039 248/205.3 |
| 8,704,769 B2 * | 4/2014 | Hotelling | ...................... | 345/163 |
| 2003/0090464 A1 * | 5/2003 | Lai | ...................... | G06F 3/03543 345/163 |
| 2005/0200604 A1 * | 9/2005 | Norman | .............. | G06F 3/03543 345/163 |
| 2005/0253811 A1 * | 11/2005 | Hiromori | ............ | G06F 3/03543 345/163 |
| 2006/0209026 A1 * | 9/2006 | Balmes | ............... | G06F 3/03543 345/163 |
| 2008/0170360 A1 * | 7/2008 | Cheng | ................ | G06F 3/03543 361/679.02 |
| 2009/0146954 A1 * | 6/2009 | Regen | ................ | G06F 3/03543 345/163 |
| 2009/0231279 A1 * | 9/2009 | Ganey | ................ | G06F 3/03543 345/163 |
| 2011/0006987 A1 * | 1/2011 | Wu | ...................... | G06F 3/03543 345/163 |
| 2012/0106057 A1 * | 5/2012 | Lee | ..................... | G06F 3/03543 361/679.4 |
| 2013/0342461 A1 * | 12/2013 | Ho | .......................... | G06F 3/033 345/163 |

* cited by examiner

*Primary Examiner* — Fred Tzeng
(74) *Attorney, Agent, or Firm* — Zhigang Ma

(57) ABSTRACT

A computer mouse includes a mouse device and a size-augmenting device. The mouse device includes a mouse body, a mouse button and a mouse roller mounted on a top side of the mouse body, and a sensing device mounted on a bottom side of the mouse body. The size-augmenting device includes a shell body defining a receiving slot for receiving the mouse body. The receiving slot extends through a top surface and a bottom surface of the shell body.

16 Claims, 3 Drawing Sheets

COMPUTER MOUSE HAVING VARIABLE SIZE

CROSS-REFERENCE TO RELATED APPLICATIONS

This application claims priority to Chinese Patent Application No. 201410543608.9 filed on Oct. 15, 2014, the contents of which are hereby incorporated by reference.

FIELD

The disclosure generally relates to computer mice, and more particularly relates to computer mice having a variable size.

BACKGROUND

Computer mice are one of the most commonly employed computer-input devices or man-machine interfaces. In practice, it is always found that a fixed size computer mouse is not suitable for users of different ages. For example, a computer mouse having a size for an adult is not suitable for a young child for the child's hand is smaller than the adult's hand.

SUMMARY

A computer mouse including a mouse device and a size-augmenting device is disclosed. The mouse device includes a mouse body, a mouse button and a mouse roller mounted on a top side of the mouse body, and a sensing device mounted on a bottom side of the mouse body. The size-augmenting device includes a shell body defining a receiving slot for receiving the mouse body, a plug mounted to the shell body, and a laser generator mounted to the shell body and configured to produce a laser beam. The receiving slot extends through a top surface and a bottom surface of the shell body. When the mouse body is received in the receiving slot of the shell body, the plug is inserted to the socket.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
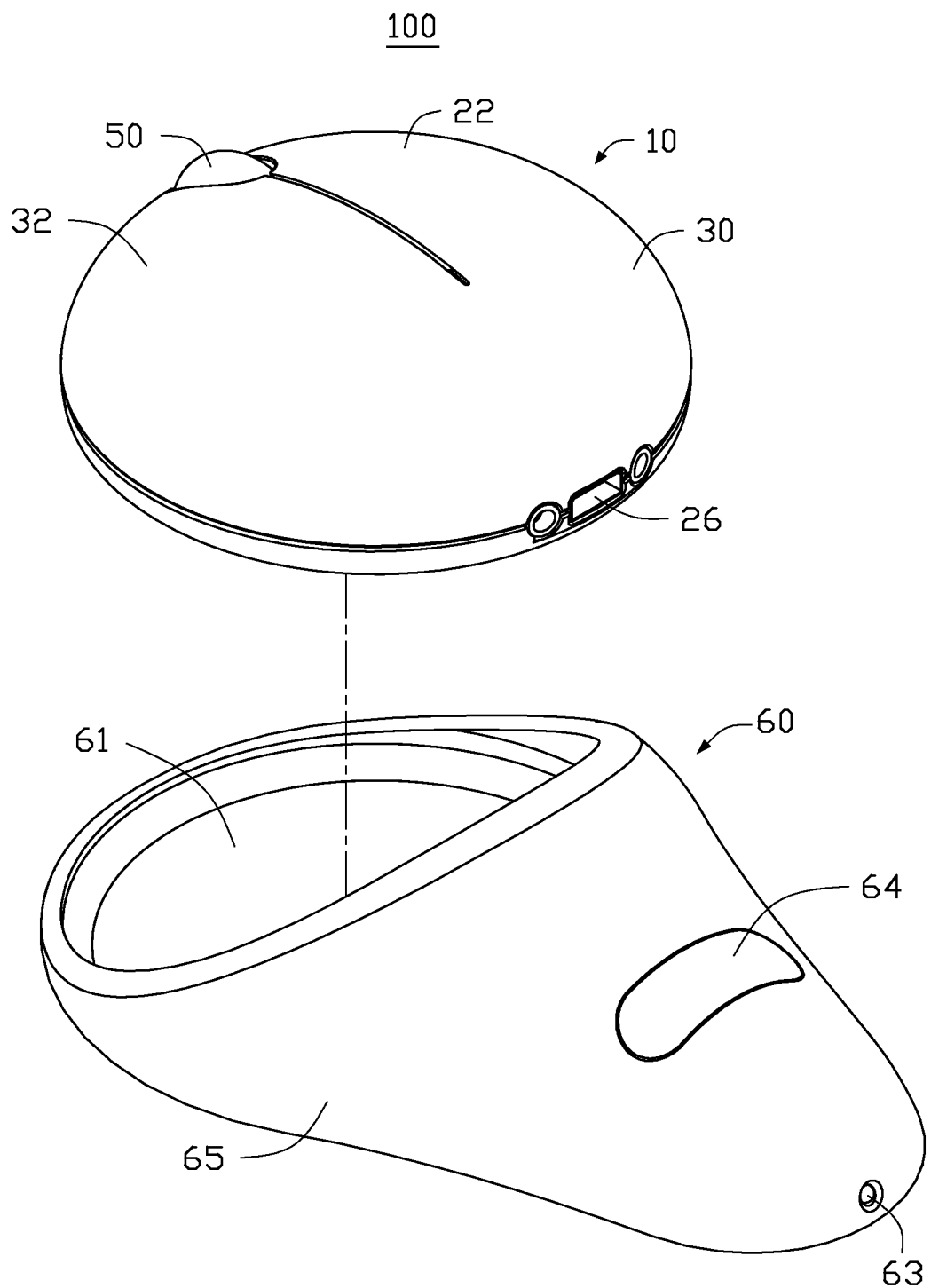
FIG. 1 is an exploded, isometric view of an embodiment of a computer mouse.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references can mean "at least one."

The term "comprising" means "including, but not necessarily limited to"; it specifically indicates open-ended inclusion or membership in a so-described combination, group, series and the like.

FIG. 1 illustrates an embodiment of a computer mouse 100. The computer mouse 100 can include a mouse device 10 and a size-augmenting device 60. The size-augmenting device 60 can be attached to the mouse device 10 to increase the overall size of the mouse device 10.

The mouse device 10 can include a mouse body 30, a right mouse button 22, a left mouse button 32, a mouse roller 50, and a socket 26. The right mouse button 22, the left mouse button 32, and the mouse roller 50 are mounted on a top side of the mouse body 30. The socket 26 is mounted to the mouse body 30 and located adjacent to a bottom edge of the mouse body 30. The mouse device 10 can also include a detecting or sensing device (not shown) mounted on a bottom side of the mouse body 30.

The size-augmenting device 60 can include a shell body 65, a laser generator 63, and a switch 64.

The shell body 65 defines a receiving slot 61 for receiving the mouse device 10. The receiving slot 61 extends through a bottom surface and a top surface of the shell body 65. The shell body 65 has a palm rest profile. A user's palm can be supported by the shell body 65 when the user operates the computer mouse 100.

The laser generator 63 is mounted to shell body 65 and located to a bottom edge of the shell body 65. The laser generator 63 can produce a laser beam. The switch 64 is mounted on a top side of the shell body 65. The switch 64 can be activated to switch on/off the laser generator.

Figure 2:
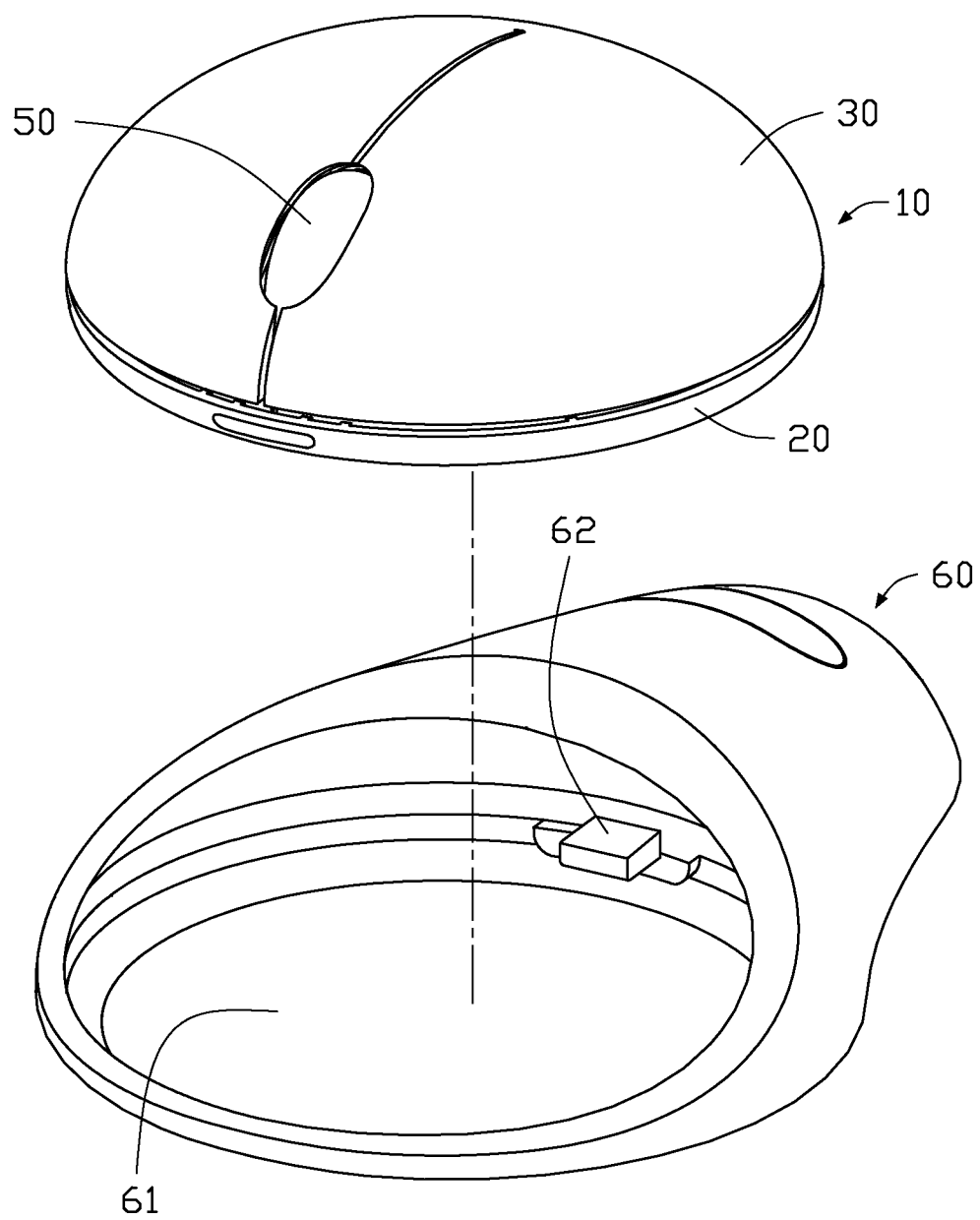
FIG. 2 is similar to FIG. 1, but viewed from another angle.

FIG. 2 illustrates that the size-augmenting device 60 can include a plug 62. The plug 62 is mounted to the shell body 65 and located inside of the receiving slot 61 of the shell body 65. The plug 62 can be inserted to the socket 26 of the mouse device 10 and an electrical connection can be established between the mouse device 10 and the size-augmenting device 60. The mouse device 10 can provide power to the laser generator 63 via the socket 26 and the plug 62.

Figure 3:
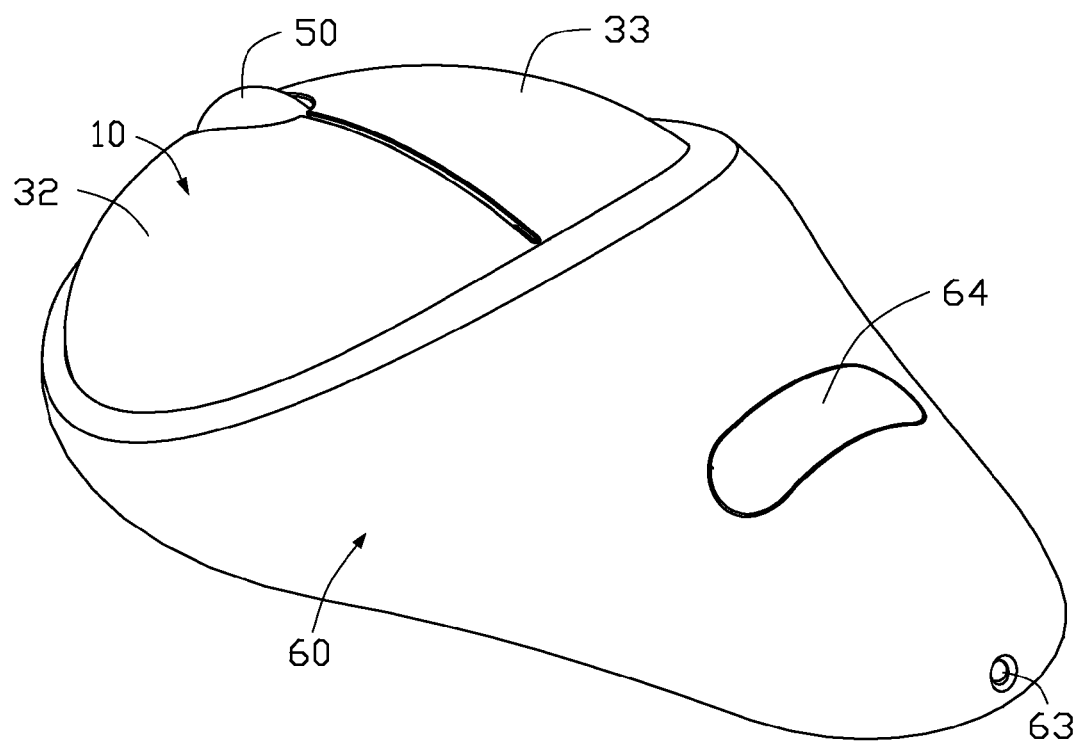
FIG. 3 is an assembled view of the computer mouse of FIG. 1.

FIG. 3 illustrates that when in assembly, the size-augmenting device 60 is attached to the mouse device 10. The mouse body 30 of the mouse device 10 is received in the receiving slot 61 of the size-augmenting device 60. The plug 62 is inserted to the socket 26 of the mouse device 10 and an electrical connection is established between the mouse device 10 and the size-augmenting device 60. The user can thus operate the computer mouse 100 which has a relatively greater size.

The mouse device 10 provides power to the laser generator 63 via the socket 26 and the plug 62. When the user activates the switch 64, a laser beam is emitted from the laser generator 63 towards a target, generally during a presentation or the like.

When the user prefers using a mouse of a smaller size, the user can detach the size-augmenting device 60 away from the mouse device 10. Then the user can use the mouse device

10 of an original size which is smaller than the size of the assembled computer mouse 100.

The embodiments shown and described above are only examples. Even though numerous characteristics and advantages of the present technology have been set forth in the foregoing description, together with details of the structure and function of the present disclosure, the disclosure is illustrative only, and changes may be made in the details, including in matters of shape, size and arrangement of the parts within the principles of the present disclosure up to, and including, the full extent established by the broad general meaning of the terms used in the claims.

What is claimed is:

1. A computer mouse comprising:
   a mouse device comprising a mouse body, a mouse button and a mouse roller mounted on a top side of the mouse body, and a sensing device mounted on a bottom side of the mouse body;
   a socket mounted to the mouse body; and
   a size-augmenting device comprising a shell body defining a receiving slot for receiving the mouse body, a plug mounted to the shell body, and a laser generator mounted to the shell body and configured to produce a laser beam, wherein the receiving slot extends through a top surface and a bottom surface of the shell body; when the mouse body is received in the receiving slot of the shell body, the plug is inserted to the socket.

2. The computer mouse of claim 1, wherein the socket is located adjacent to a bottom edge of the mouse body.

3. The computer mouse of claim 1, wherein the plug is located inside of the receiving slot of the shell body.

4. The computer mouse of claim 1, wherein the laser generator is located adjacent to a bottom edge of the shell body.

5. The computer mouse of claim 1, wherein when the mouse body is received in the receiving slot of the shell body, the plug is electrically connected to the socket and the mouse device is configured to provide power to the laser generator through the socket and the plug.

6. The computer mouse of claim 1, wherein the size-augmenting device further comprises a switch mounted on a top side of the shell body and configured to switch on/off the laser generator.

7. The computer mouse of claim 1, wherein the shell body has a palm rest profile.

8. A computer mouse comprising:
   a mouse device comprising a mouse body, a mouse button and a mouse roller mounted on a top side of the mouse body, and a sensing device mounted on a bottom side of the mouse body; and
   a size-augmenting device comprising a shell body defining a receiving slot for receiving the mouse body and a laser generator mounted to the shell body, the laser generator configured to produce a laser beam.

9. The computer mouse of claim 8, wherein the laser generator is located adjacent to a bottom edge of the shell body.

10. The computer mouse of claim 8, wherein the receiving slot extends through a top surface and a bottom surface of the shell body.

11. The computer mouse of claim 10, wherein the mouse device further comprises a socket mounted to the mouse body, the size-augmenting device further comprises a plug mounted to the shell body, and when the mouse body is received in the receiving slot of the shell body, the plug is inserted to the socket.

12. The computer mouse of claim 11, wherein the socket is located adjacent to a bottom edge of the mouse body.

13. The computer mouse of claim 11, wherein the plug is located inside of the receiving slot of the shell body.

14. The computer mouse of claim 11, wherein when the mouse body is received in the receiving slot of the shell body, the plug is electrically connected to the socket and the mouse device is configured to provide power to the laser generator through the socket and the plug.

15. The computer mouse of claim 11, wherein the size-augmenting device further comprises a switch mounted on a top side of the shell body and configured to switch on/off the laser generator.

16. The computer mouse of claim 8, wherein the shell body has a palm rest profile.

* * * * *